US006867769B1

(12) United States Patent
Toriya et al.

(10) Patent No.: US 6,867,769 B1
(45) Date of Patent: Mar. 15, 2005

(54) GENERATION OF FREE-FORM SURFACE MODEL BY REVERSIBLE ROUNDING OPERATION

(75) Inventors: Hiroshi Toriya, Tokyo (JP); Tsuyoshi Harada, Tokyo (JP); Makoto Yajima, Tokyo (JP); Akira Wakita, Tokyo (JP)

(73) Assignees: Ricoh Company, Ltd., Tokyo (JP); Lattice Technology, Inc., Tokyo (JP)

( * ) Notice: Subject to any disclaimer, the term of this patent is extended or adjusted under 35 U.S.C. 154(b) by 0 days.

(21) Appl. No.: 09/526,558

(22) Filed: Mar. 16, 2000

(30) Foreign Application Priority Data

Mar. 18, 1999 (JP) .......................................... 11-074588
Jan. 6, 2000 (JP) ...................................... 2000-001136

(51) Int. Cl.[7] .......................................... G06T 17/00
(52) U.S. Cl. ...................................................... 345/420
(58) Field of Search ............................... 345/419, 420; 700/98, 187

(56) References Cited

U.S. PATENT DOCUMENTS 6,198,979 B1 * 3/2001 Konno ........................ 700/98
6,204,860 B1 * 3/2001 Singh ......................... 345/420

OTHER PUBLICATIONS

Chadwick et al., "Layered Construction for Deformable Animated Characters," Jul. 1989, ACM Computer Graphics, vol. 23, No. 3, pp. 243–252.*

Foley et al., Computer Graphics Principles and Practice: Second Edition in C, Jul. 1997, Addison–Wesley, Chapter 11.*

Chaki, "A Study on Flexible Surface Control by Control Lattice," 1998, Keio University, pp. 7–9.*

Y. Chaki, pp. 5–49, "A Study on Flexible Surface Control by Control Lattice", Jan. 16, 1998.

M. Eck, et al., pp. 325–334, "Automatic Reconstruction of B–Spline Surfaces of Arbitrary Topological Type", 1996.

M. Eck, et al., pp. 173–182, "Multiresolution Analysis of Arbitrary Meshes", 1995.

* cited by examiner

*Primary Examiner*—Mark Zimmerman
*Assistant Examiner*—Lance W. Sealey
(74) *Attorney, Agent, or Firm*—Oblon, Spivak, McClelland, Maier & Neustadt, P.C.

(57) ABSTRACT

A method of generating a free-form surface model includes the steps of applying linear transformation to a lattice polygon model to generate vertices of a free-form surface model corresponding to respective vertices of the lattice polygon model, and generating control points of cubic Bezier curves that connect the vertices of the free-form surface model, and that correspond to respective edges of the lattice polygon model.

16 Claims, 14 Drawing Sheets

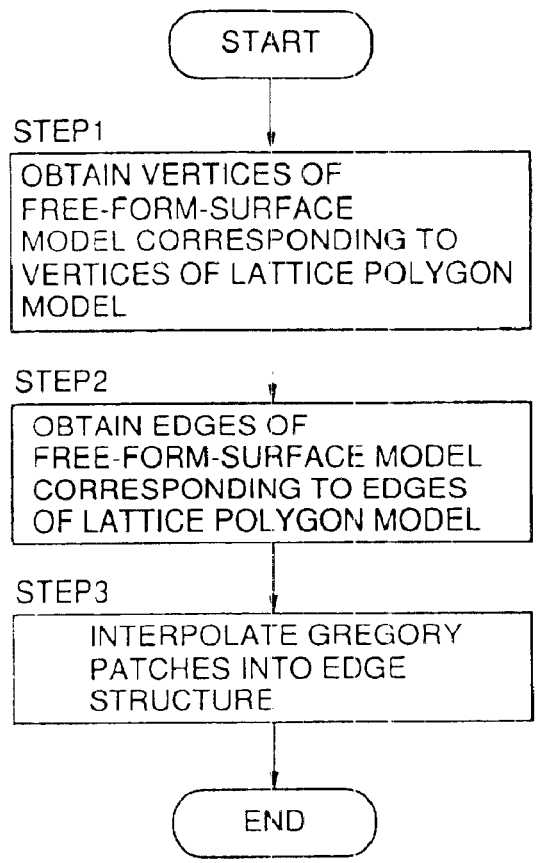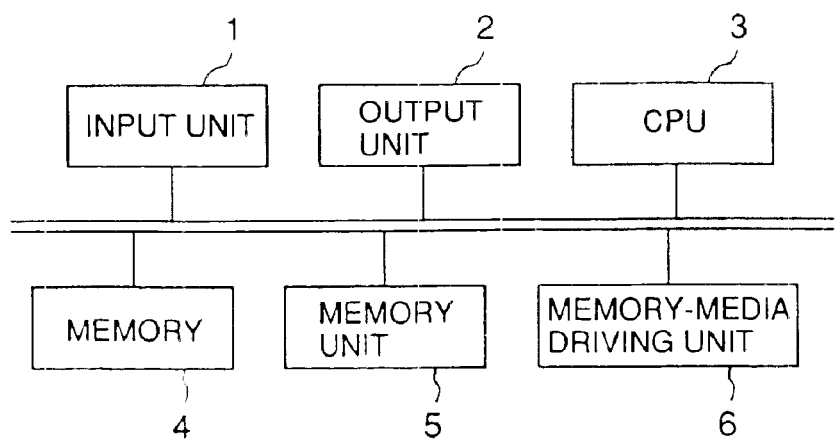

FIG.13A

| INDEX ↓ | COORDINATES (x,y,z) LATTICE POLYGON MODEL | COORDINATES (x,y,z) OF FREE-FORM-SURFACE MODEL |
|---|---|---|
| P0 | | |
| P1 | | |
| P2 | | |
| ⋮ | | |
| Pn | | |

FIG.13B

EACH ROW INCLUDING INDICES OF VERTEX-COORDINATE TABLE

| P0 | P1 | P2 | | |
|---|---|---|---|---|
| P2 | P1 | P7 | P5 | |
| P5 | P7 | P3 | P8 | P4 |
| | | | | |

FIG.13C

EACH ROW INCLUDING INDICES OF VERTEX-COORDINATE TABLE

| START POINT | END POINT | CONTROL POINT 1 | CONTROL POINT 2 |
|---|---|---|---|
| P0 | P1 | C0 | C1 |
| P1 | P2 | C2 | C3 |
| P2 | P3 | C4 | C5 |
| | | | |

FIG.13D

| INDEX ↓ | COORDINATES (x,y,z) |
|---|---|
| C0 | |
| C1 | |
| C2 | |
| ⋮ | |
| Ck | |

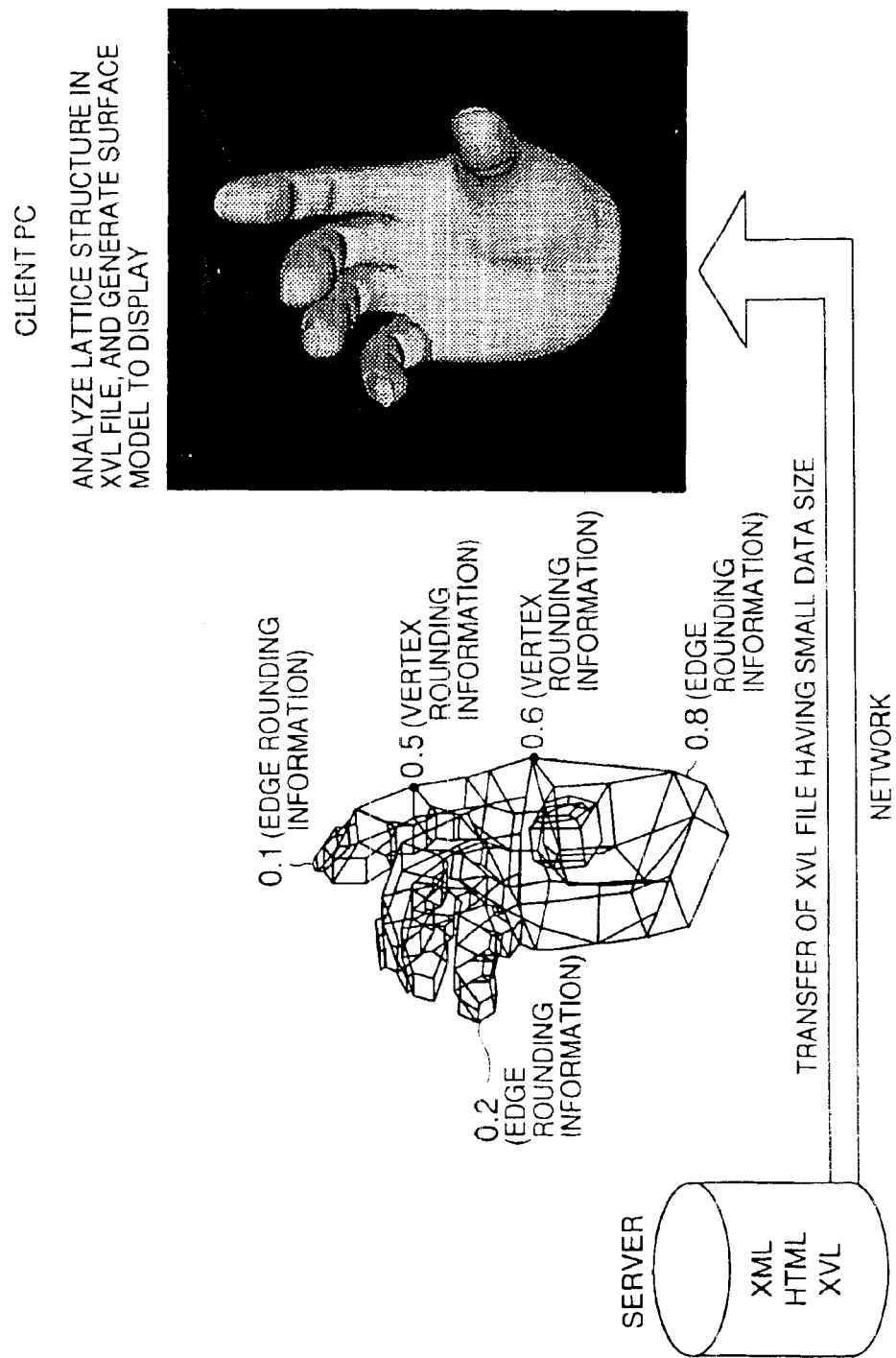

GENERATION OF FREE-FORM SURFACE MODEL BY REVERSIBLE ROUNDING OPERATION

BACKGROUND OF THE INVENTION

1. Field of the Invention

The present invention generally relates to a method of generating a free-form surface model based on a reversible rounding operation, a method of generating a lattice polygon model from the generated free-form surface model, a record medium having a program embodied therein for practicing these methods, and a method of transmitting and displaying the free-form surface model. The present invention particularly relates to a method generating a free-form surface model through a perfectly reversible rounding operation where an accurate free-form surface model can be generated.

2. Description of the Related Art

A shape represented by a lattice polygon model is characterized by its simple structure that is easy to design. A lattice polygon model can be turned into a free-form surface model by a rounding operation. Use of the rounding operation makes it possible to readily generate a free-form surface model by designing a lattice polygon model. In the prior art, however, there is no known scheme to reconstruct an original lattice polygon model from a free-form surface model generated therefrom. Once a free-form surface model is generated, the original lattice polygon model cannot be obtained from the data of the generated model shape alone, thereby preventing reuse of the lattice polygon model to create another form.

In a network environment today, transfer and exchange of 3D data are not performed on a frequent basis. A standard representation of 3D shapes that is used when transferring 3-dimensional data over a network is VRML (Virtual Reality Modeling Language). In VRML, data is represented by a set of flat planes that are polygons. A polygon representation has a drawback in that an increase in a level of detail of a represented shape requires an increase in data size. In particular, data that represents many free-form surfaces requires a large number of polygons, resulting in an undesirably large data size. This discourages transfer of data over a network. A further problem is that when polygon-representation data is transferred, a displayed shape has a level of detail that can be decreased but cannot be increased. In this manner, a 3D shape cannot be represented with sufficient quality if a small data size is used, thereby severely discouraging use of 3D data in a network environment.

In another field of endeavor, 3D-CAD systems used in manufacturing industries use a data-representation scheme that represents a solid model having detailed free-form surface data. Such data representation is now beginning to be supported by standard formats such as IGES (Initial Graphic Exchange Specification) or STEP (Standard for the Exchange of Product Model Data). In the world of CAD, a precise shape-representation scheme called a trimmed free-form surface has been used for the purpose of representing generated free-form surfaces with high accuracy. Such schemes are suitable for highly accurate representation of shape. Because of a required large data size, however, it is difficult to use these schemes in the network environment.

Reversible rounding schemes known to date include those disclosed in: (1) Japanese Patent Laid-open Application No. 9-314697; (2) Atsushi Nakamura, "A Study on Free-form Deformation with Rounding Operation," a Master's Thesis with Keio University, Graduate School of Media and Governance, 1998; and (3) Yuichiro Chaki, "A Study on Flexible Surface Control by Control Lattice," a Master's Thesis with Keio University, Graduate School of Media and Governance, 1998. These schemes are not perfect, however, in that there is a requirement, among others, that all surfaces constituting polygons be coplanar.

There is another scheme called a subdivision surface. This scheme generates a pseudo free-form surface model by subdividing a polygon model. This scheme maintains reversibility, but is only a scheme for generating subdivided polygon models for the purpose of display. This scheme is inherently different from a scheme that generates a precise free-form surface model.

The VRML, which is a representation scheme used in the network environment, is based on use of polygons. As previously noted, a polygon-based representation has a drawback in that as an increased level of detail is pursued, data size inevitably increases. If attempt is made to represent a complex shape with a small amount of data, quality of shape representation is degraded, resulting in a lower display quality.

SUMMARY OF THE INVENTION

It is a general object of the present invention to provide a rounding operation that substantially obviates one or more of the problems caused by the limitations and disadvantages of the related art.

It is another and more specific object of the present invention to provide a rounding operation that generates a free-form surface model having the same topological structure (i.e., the same connections between shape elements) as a lattice polygon model, and matches pairs of vertices between the two models by linear transformation, thereby providing for the reconstruction of the original lattice polygon model from the generated free-form surface model.

In one aspect, the present invention generates a free-form surface model having an identical topological structure to the original lattice polygon model, and matches vertices of the lattice polygon model with vertices of the free-form surface model such as to allow coordinates of a matched vertex to be obtained through linear transformation, followed by generating unique control points of curves of the free-form surface model from the vertices of the free-form surface model, thereby attaining a reversible rounding operation.

In another aspect, the present invention provides rounding information for each lattice polygon model, so that data of a lattice structure can be generated from an externally provided free-form surface model. Further, the present invention represents all the shapes by interpolated free-form surface data, and represents free-form surface structures by abstract lattice structures, thereby making it possible to represent a 3D shape by a relatively small amount of data. Moreover, the present invention stores data of lattice structures in a server, and provides a client with a viewer that interprets a lattice structure and displays the lattice structure as free-form surface data or as detailed polygon-model data that generates a polygon model from free-form surface data, thereby achieving high-speed 3D-data transfer and display thereof.

Other features and advantages of the present invention will be set forth in the description which follows, and in part will become apparent from the description and the accompanying drawings, or may be learned by practice of the invention according to the teachings provided in the description. Objects as well as the features and advantages of the present invention will be realized and attained by a rounding operation particularly pointed out in the specification in such full, clear, concise, and exact terms as to enable a person having ordinary skill in the art to practice the invention.

BRIEF DESCRIPTION OF THE DRAWINGS

FIG. 11 is a flowchart of a process according to the first embodiment of the present invention;

FIG. 12 is a block diagram showing a computer-based implementation of the present invention;

FIGS. 13A through 13D are tables showing data structures used in the present invention;

FIG. 14 is an illustrative drawing providing a brief overlook of a second embodiment of the present invention;

DESCRIPTION OF THE PREFERRED EMBODIMENTS

In the following, embodiments of the present invention will be described with reference to the accompanying drawings.

FIGS. 13A through 13D are tables showing data structures used in a first embodiment of the present invention.

A vertex-coordinate table 200 of FIG. 13A stores therein 3-dimensional coordinates (x, y, z) of each vertex of a polygon model, which is also referred to as a lattice polygon model. The vertex-coordinate table 200 also stores therein 3-dimensional coordinates of vertices of a free-form surface model that is obtained by a method STEP1, which will be described later. The vertices of the lattice polygon model and the vertices of the free-form surface model are paired in the table.

A surface-index table 300 of FIG. 13B represents vertices of each polygon of a lattice polygon model by a series of index values, each of which indicates a row number of a row in the vertex-coordinate table 200. The size of the surface-index table 300 is equal to the number of lattice polygons.

An edge-index table 400 of FIG. 13C represents edges of a lattice polygon model and a free-form surface model where the edges are each represented by a pair of vertices (i.e., a start point and an end point). The start points and the end points are indices to the rows of vertex-coordinate table 200. In the case of a free-form surface model, pairs of control points that are obtained when transforming a straight-line edge into a cubic Bezier curve are added in the edge-index table 400. These control points are indices to a control-point-coordinate table 500, which is shown in FIG. 13D.

Figure 10:
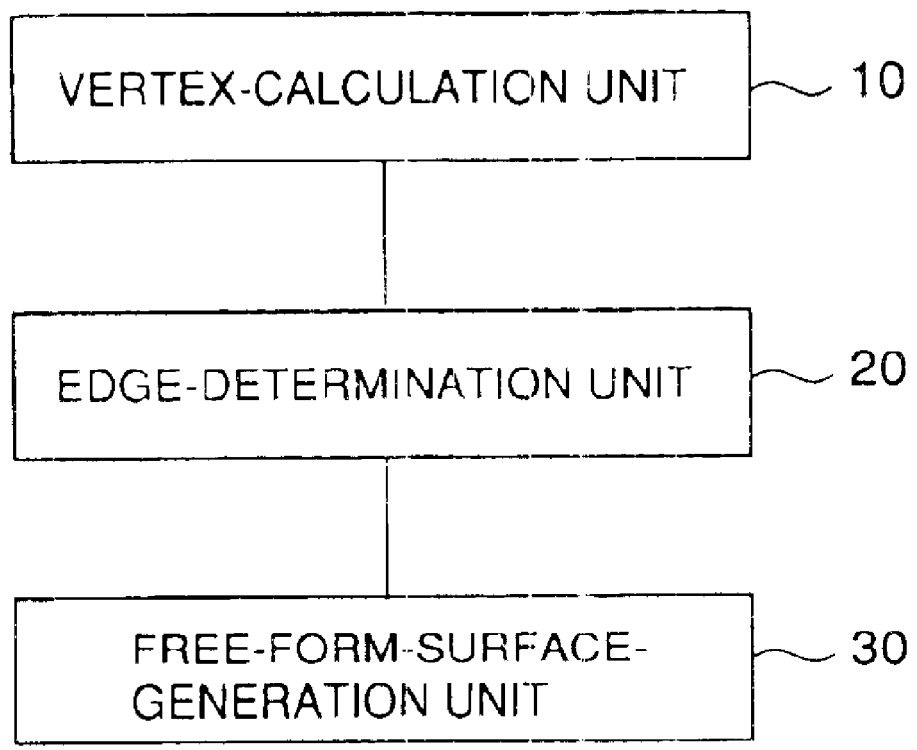
FIG. 10 is a block diagram showing a configuration of a first embodiment according to the present invention.

FIG. 10 is a functional block diagram showing a configuration of a first embodiment of the present invention.

A vertex-calculation unit 10 calculates vertices of a free-form surface model that correspond to vertices of a lattice polygon model referred to in the vertex-coordinate table 200 by the surface-index table 300. Coordinates of these new vertices are calculated from linear transformation of coordinates of original vertices. The coordinates of the vertices of the free-form surface model are stored in their designated places in the vertex-coordinate table 200.

An edge-determination unit 20 refers to the vertex-coordinate table 200, the surface-index table 300, and the edge-index table 400, and determines edge geometries of the free-form surface model that correspond to edges of the lattice polygon model. The edge geometries of the free-form surface model are represented by cubic Bezier curves, so that control points are generated to represent the curves, and are stored in the control-point-coordinate table 500. Further, indices to the entries of the control-point-coordinate table 500 are stored in their designated places in the edge-index table 400.

A free-form-surface-generation unit 30 refers to the vertex-coordinate table 200, the surface-index table 300, and the edge-index table 400, and interpolates Gregory free-form surfaces into the free-form surface model comprised of cubic Bezier curves. This results in a free-form surface model having the same topological structure as the lattice polygon model.

The coordinates of vertices of the free-form surface model, which are obtained by transforming the lattice polygon model, are obtained as a linear transformation of the coordinates of vertices of the lattice polygon model. Namely, with vertices of the lattice polygon model being Vi, new vertices Pj are represented by an equation (1) as follows:

$$Pj = \sum_{i=1}^{n} KijVi \; (j = 1, 2, \ldots, n) \tag{1}$$

where n is the number of vertices. A linear transformation has an inverse transformation thereof. Namely, the vertices Vi can be obtained by an equation (2) as follows.

$$V_i = \sum_{j=1}^{n} l_{ij} P_j \ (i = 1, 2, \ldots, n) \qquad (2)$$

In this manner, vertex coordinates of the original lattice polygon model can be derived from vertex coordinates of the obtained free-form surface model. By placing straight-line edges between the derived vertices, the original lattice polygon model can be reconstructed. Namely, an inverse rounding operation is attained. Further, data of the lattice polygon model may be transferred via a network, and the rounding operation is applied to the data at a client PC of the receiver end to generate a free-form surface model. Further, the data may be displayed as a detailed polygon model.

FIG. 11 is a flowchart of a process according to this embodiment. The process will be described with reference to a lattice polygon model shown in FIG. 1

STEP1

Figure 1:
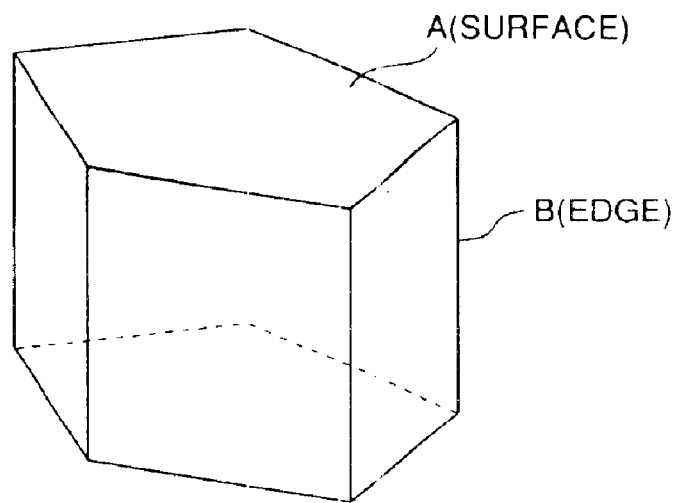
FIG. 1 is an illustrative drawing showing a lattice polygon model.
Figure 2:
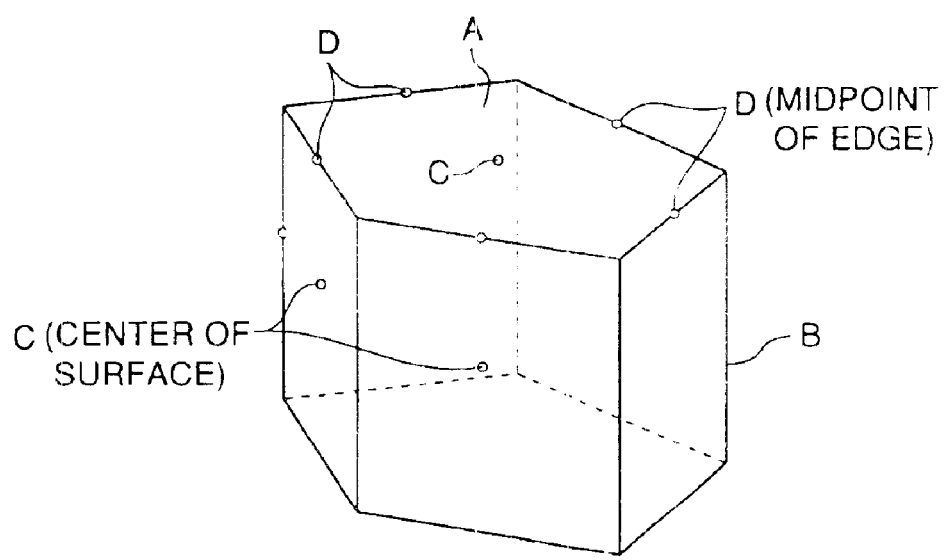
FIG. 2 is an illustrative drawing for explaining generation of center points of surfaces and midpoints of edges with respect to the lattice polygon model of FIG. 1.
Figure 3:
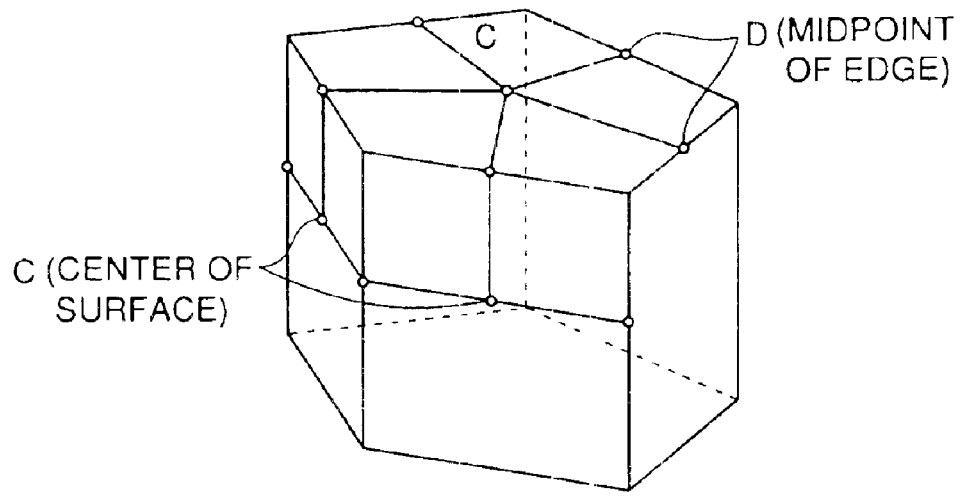
FIG. 3 is an illustrative drawing showing a quadrilateral division of the lattice polygon model.

(I) All the surfaces A constituting the lattice polygon model in FIG. 1 are divided into quadrilaterals. To this end, center points C of the surfaces A and midpoints D of the edges B are obtained as shown in FIG. 2. A center of a surface is derived by obtaining averages of coordinates of the vertices Vi that make up the surface. When deriving the surface center, weights may be given to the vertices so as to change a position of the surface center C and the midpoints D. As shown in FIG. 3, the quadrilateral division of the surfaces A is carried out by drawing lines between the surface center C and the midpoints D of the edges B.

Figure 4:
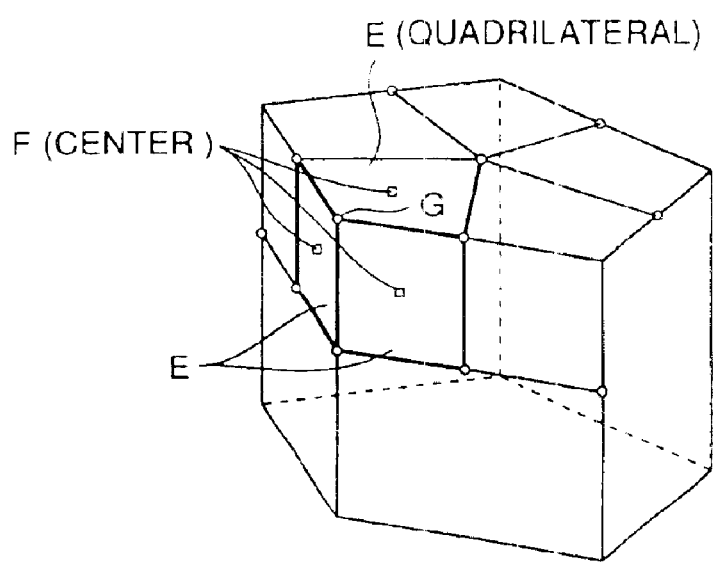
FIG. 4 is an illustrative drawing for explaining how to obtain center points for generated quadrilaterals.

(II) A center F of a given quadrilateral E generated as described above is obtained from the vertices of the given quadrilateral E as shown in FIG. 4. As in the case described above, the center F is calculated by obtaining averages of coordinates of the vertices that constitute the quadrilateral where weights may be given to the vertices.

Figure 5:
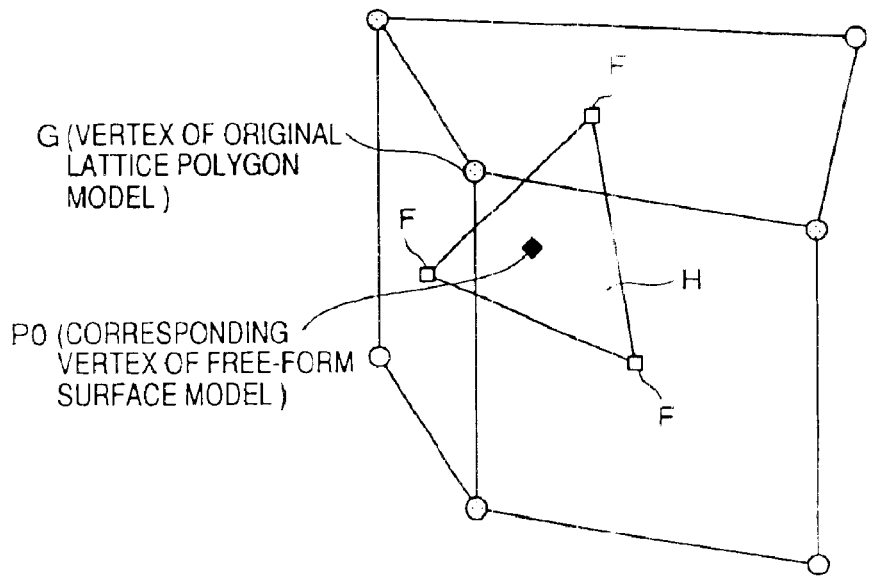
FIG. 5 is an illustrative drawing for explaining how to obtain vertices of a free-form surface model.

(III) As shown in FIG. 5, a polygon H is generated by connecting the centers F of the quadrilaterals around a vertex G of the original lattice polygon model. Then, a center P0 of the vertices of the polygon H is obtained. P0 becomes a vertex of a new surface model corresponding to the vertex G. As in the case described above, the center P0 is calculated by obtaining averages of coordinates of the vertices that constitute the polygon where weights may be given to the vertices. The center P0 is a vertex of the free-form surface model that corresponds to the vertex G of the original lattice polygon model. As described hereinbefore, in terms of coordinates, the center P0 is an average of the center points F, each of which is an average of the center point C and the midpoints D where the center point C and the midpoints D are averages of the vertices of the lattice polygon model. Therefore, the center point P0 is represented as a linear transformation of vertices of the original lattice polygon model.

STEP2

Figure 6:
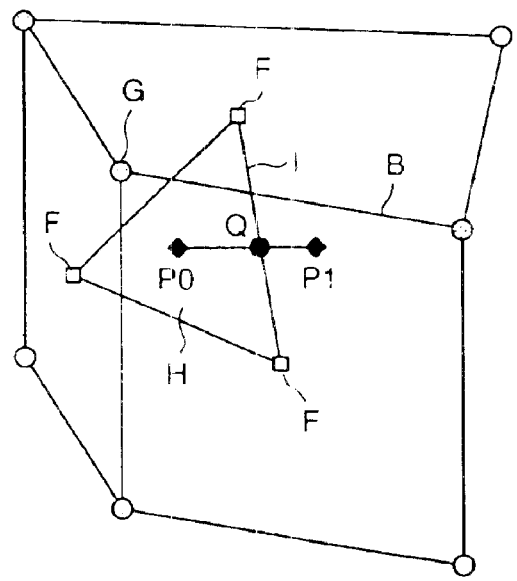
FIG. 6 is an illustrative drawing for explaining how to obtain tangents to an edge of the free-form surface model.
Figure 7:
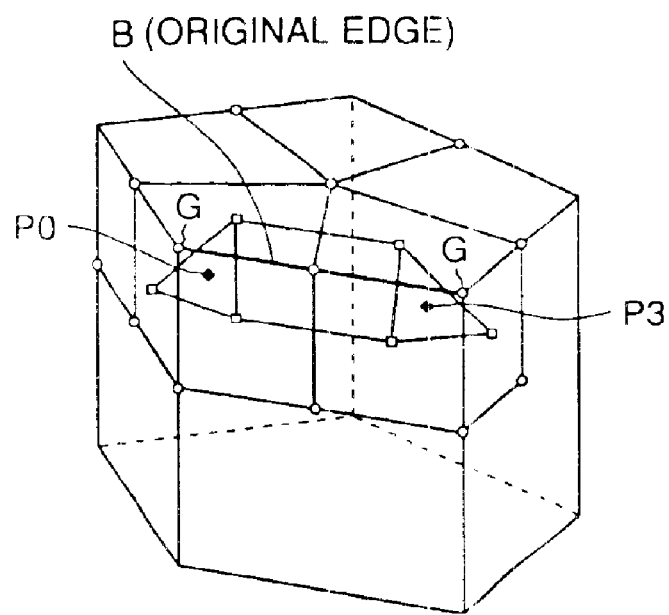
FIG. 7 is an illustrative drawing for explaining how to determine the free-form surface model.
Figure 8:
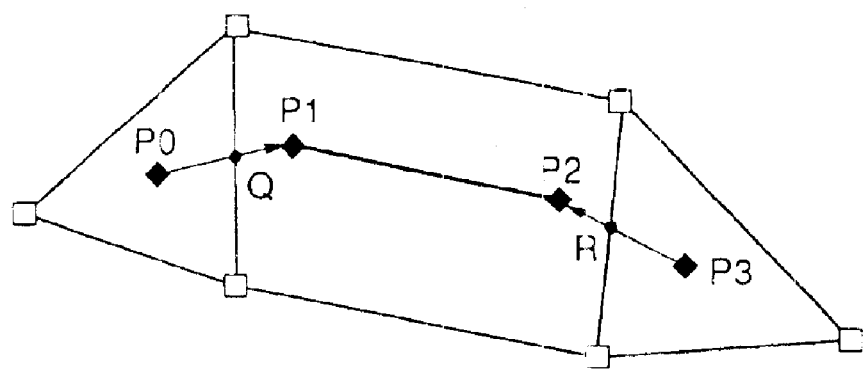
FIG. 8 is an illustrative drawing for explaining how to determine control points.

(I) As shown in FIG. 6, the center point P0 and a midpoint Q of an edge I of the polygon H are connected to define a vector P0Q (II) A shape of a curve is defined such that the vector as defined above is a tangent to the curve. For example, a shape of a curve corresponding to a straight line B as shown in FIG. 7 will be obtained. End points of the curve are the point P0 and the point P3. As shown in FIG. 8, a vector P3R is defined in the same manner as for the vector P0Q by connecting between the center point (new vertex) P3 and a midpoint R of a relevant edge of the polygon. Control points P1 and P2 shown in FIG. 8 are obtained such as to satisfy the following relations:

$P0P1 = (\frac{1}{3})P0Q$ $P3P2 = (\frac{1}{3})P3R$ (III) The control points P0, P1, P2, and P3 are connected in this order so as to define a cubic Bezier curve that corresponds to the original edge B shown in FIG. 7.

STEP3

(I) A free-form surface surrounded by cubic Bezier curves can be interpolated by a Gregory patch according to a technique known in the art as described in Hiroaki Chiyokura and Hiroshi Toriya, "Basics and Applications of 3D CAD," Kyoritsu Press, 1991. In this manner, shapes of free-form surfaces are fixed, and a shape of the free-form surface model is determined.

EXAMPLE

Figure 9B:
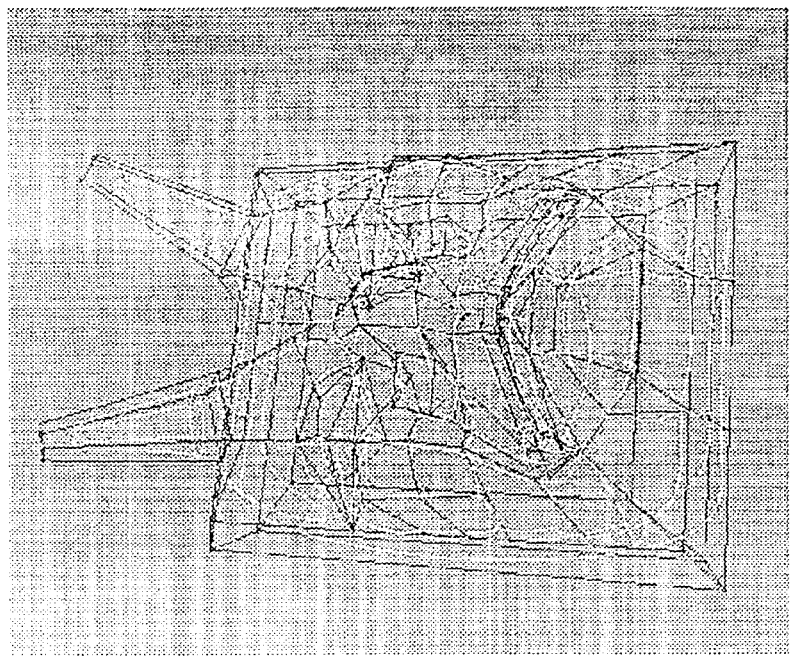
FIGS. 9A and 9B are illustrative drawings respectively showing a lattice polygon model and a free-form surface model generated according to the present invention.
Figure 9A:
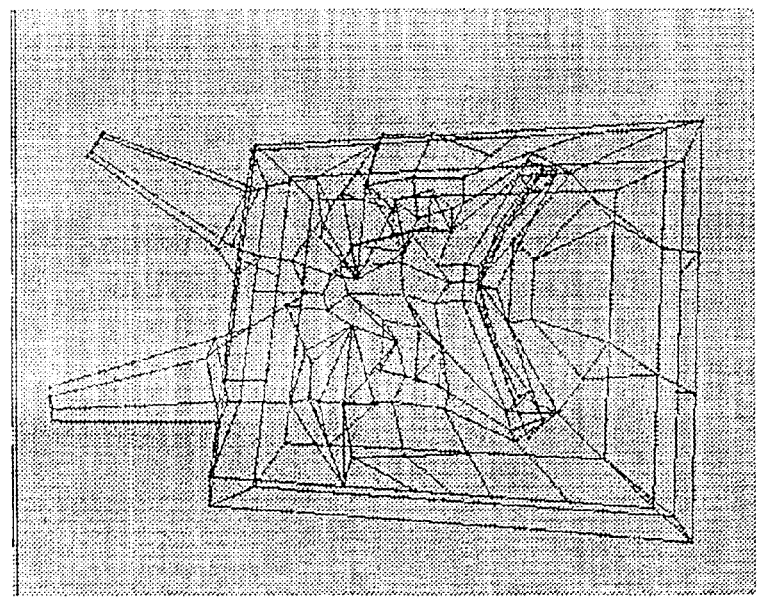

FIG. 9A is an illustrative drawing showing a lattice polygon model. FIG. 9B is an illustrative drawing showing a free-form surface model generated according to the present invention. The lattice polygon model of FIG. 9A and the free-form surface model of FIG. 9B have one-to-one correspondences therebetween in terms of vertices, edges, and surfaces. The inverse rounding operation thus can be applied to the shape shown in FIG. 9B to generate the shape shown in FIG. 9A.

The present invention is not limited to the embodiment described above, but can be applicable by use of a computer system as shown in FIG. 12.

An input unit 1 is comprised of a keyboard, a mouse, a touch panel, etc., and is used for entering information. An output unit 2 outputs various output information and information entered by using the input unit 1, and is comprised of a display device, a printer, or the like. A CPU 3 executes various programs. A memory 4 stores therein the programs, and, also, serves as a temporal storage to store information generated during execution of the programs. A memory unit 5 stores therein the programs, data, information generated during program execution, etc. A memory-media driving unit 6 has a memory medium mounted therein for recording programs and data, and reads the programs and data from the memory medium to supply them to the memory 4 and/or the memory unit 5. The memory-media driving unit 6 may also be used as a temporal storage for data input/output and/or for providing memory space for execution of the programs.

In such a computer configuration, each function shown in FIG. 10 is implemented as a program or a program unit, and is recorded in a memory medium such as a CD-ROM. The CD-ROM is then mounted in a CD-ROM drive of a computer, and each program is loaded into the computer to carry out a corresponding function of the present invention.

The memory medium may be a semiconductor medium such as a ROM, an IC memory card, etc., an optical medium such as a DVD-ROM, an MO, an MD, a CD-R, etc., or a magnetic medium such as a magnetic tape, a flexible disc, etc.

Further, the programs for implementing the functions of the present invention may be provided via a communication medium rather than via a memory medium.

In the following, a second embodiment of the present invention will be described.

FIG. 14 is an illustrative drawing-providing a brief overview of the second embodiment of the present invention.

In this second embodiment, a lattice structure that is a combination of a lattice polygon model and rounding information is used for representing shape rather than using a polygon structure that roughly approximates an original shape. Use of such a lattice structure enables free-form surfaces to be represented with high accuracy. Further, such a lattice structure can be transferred over a network because of a small data size thereof. In the first embodiment, a rounding operation generates a free-form surface model from a lattice polygon model alone. In the second embodiment, on the other hand, rounding information about lattice points and edges is provided in addition to the lattice polygon model, so that the rounding operation is applied to the combination of the model and the information, which may be transferred via a network to enable a client PC to process the data. A lattice kernel provided in the PC, which receives a lattice structure via high-speed data transfer, analyzes the lattice structure and generates free-form surface data from the lattice structure. The lattice kernel then displays the free-form surface data by using a detailed polygon model, thereby reconstructing with a high-speed CPU an image that looks real. Hereinafter, this new format is called XVL (extended VRML with lattice). When used on the Internet, the XVL data is attached to an HTML or XML file in the same manner as is VRML data.

Use of XVL achieves such representation and transfer of 3D data as follows.

(1) Shape is represented by a lattice structure that is a combination of a lattice polygon model and rounding information, so that a 3D shape can be represented by a relatively small amount of data compared with detailed-polygon data or free-form surface data.

(2) 3D modeling software is provided with a function (i.e., rounding function) to transform a lattice structure into a surface structure (i.e., free-form surface model), so that a shape having a surface structure can be readily designed.

(3) A function (i.e., inverse rounding function) to transform a surface structure into a lattice structure is provided, thereby making it possible to transform existing free-form surface data easily into data in the XVL format.

(4) A viewer has the rounding function built therein to transform a lattice structure into a surface structure, so that the viewer can analyze an XVL-file having a relatively small file size that is easy to transfer at a high transfer rate, thereby providing a basis for high-quality 3D display.

Figure 15:
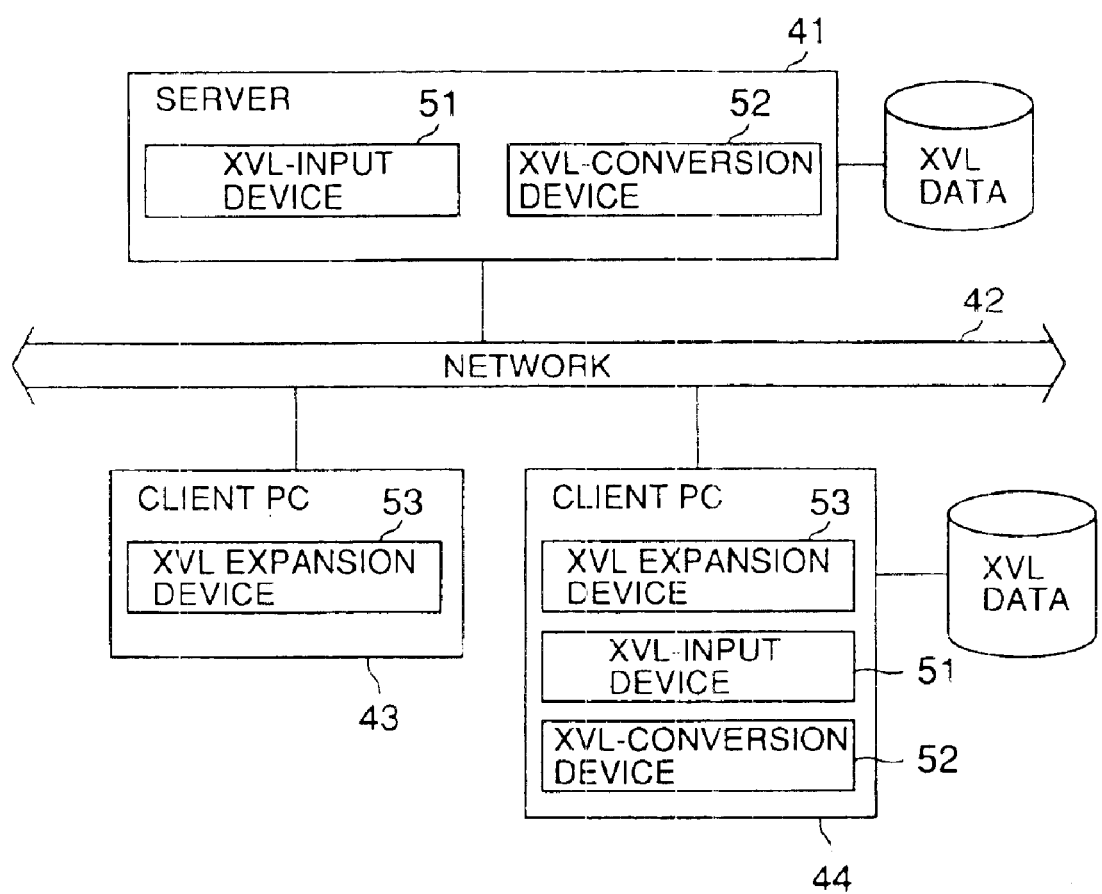
FIG. 15 is an illustrative drawing showing a configuration of a system according to the second embodiment of the present invention.

FIG. 15 is an illustrative drawing showing a configuration of a system according to the second embodiment of the present invention.

When the XVL format of the present invention is used for processing shape data, the XVL format requires around one tenth to one twentieth of the data size required in the VRML format. In the case of the second embodiment, the data size may be ⅓ times as much as the data size of the first embodiment. Such a small amount of data makes it possible to achieve a high-speed transfer of 3D data that looks real when displayed.

A server 41 includes an XVL input device 51 and an XVL conversion device 52. The XVL input device 51 is used when data in the XVL format is entered. The XVL conversion device 52 generates an XVL file by applying an inverse rounding operation of the present invention to existing free-form surface data. The server 41 delivers XVL files via a network 42. A client PC 43 and a client PC 44 each include an XVL expansion device 53. The client PC 44 is configured to include the XVL input device 51 and the XVL conversion device 52, so that the client PC 44 can attend to conversion of existing free-form surface data or generation of XVL-format data. Each device may be implemented as software.

[Representation of XVL]

Figure 16:
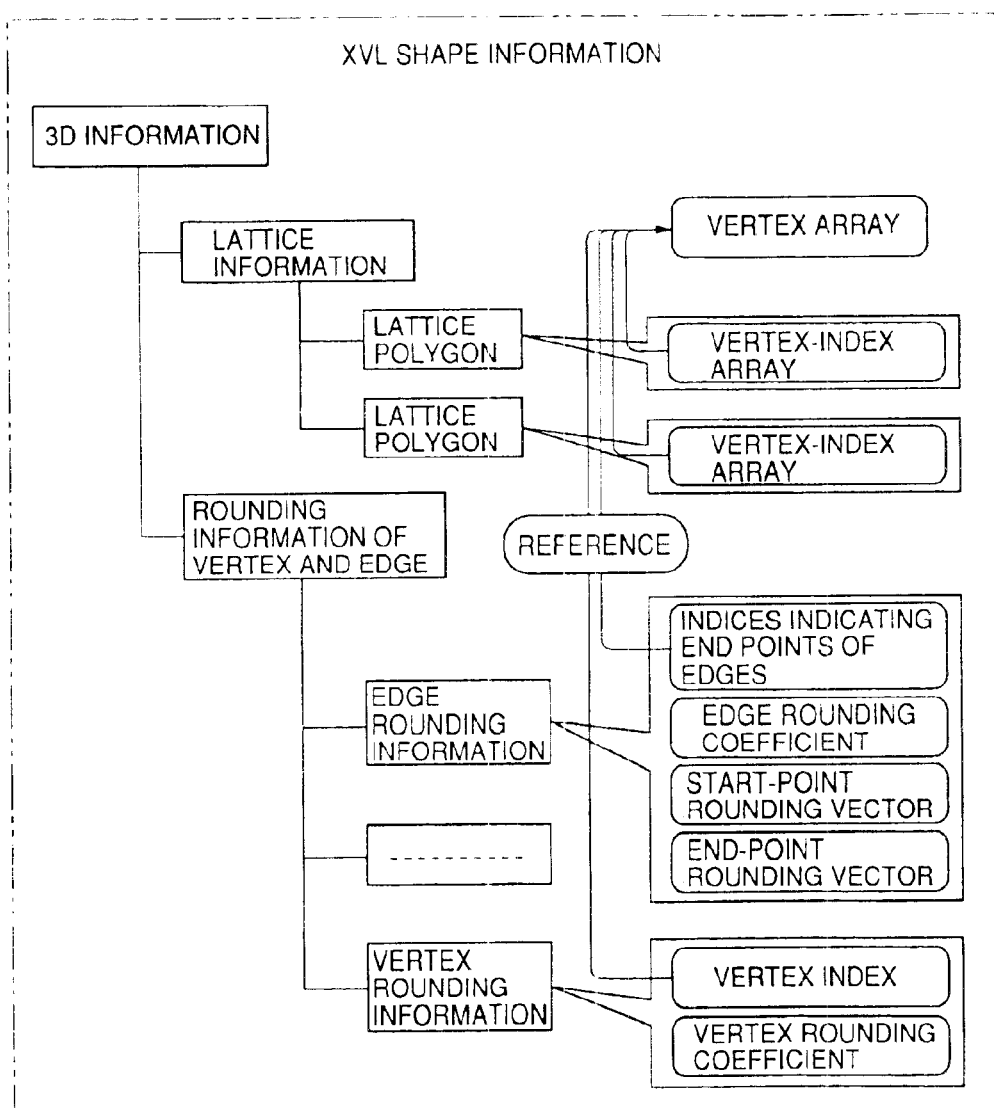
FIG. 16 is an illustrative drawing showing a data structure of shape information included in an XVL file according to the second embodiment of the present invention.

FIG. 16 is an illustrative drawing showing a data structure of shape information included in an XVL file according to the second embodiment of the present invention.

A lattice polygon model has the same data structure as that described in connection with the first embodiment. A method of describing a lattice structure (i.e., a lattice polygon model plus rounding information) in a file will be explained below.

A lattice polygon model is represented as normal polygon data (which is referred to herein as lattice polygon data). Namely, the lattice polygon model is represented by an array including coordinates of vertices that constitute lattice polygons and by an index array that specifies connections between the vertices to represent the lattice polygons. In the XVL format, rounding information attached to each vertex and each edge is provided in addition to the lattice information, thereby permitting fine control of free-form surface shapes. The rounding information includes an index specifying a vertex and a rounding coefficient of the indicated vertex with respect to each of the vertices. The rounding information further includes an index specifying an edge (i.e., a pair of indices indicating two end points of the edge), a rounding coefficient of the edge, a start-point rounding vector (i.e., vector that defines a tangent vector on the side of the start point of the edge), and an end-point rounding vector (i.e., vector that defines a tangent vector on the side of the end point of the edge) with respect to each of the edges. Here, the indices each indicate numbers indicative of array elements in the array that includes coordinates of vertices constituting the lattice polygon data.

A rounding coefficient of an indicated vertex or an indicated edge specifies how close a corresponding portion of a generated free-form surface shape comes to the indicated vertex or to the indicated edge. As the rounding coefficient approaches zero, the free-form surface shape has the corresponding portion thereof closer to the lattice vertex or edge. As the rounding coefficient becomes larger, the free-form surface shape becomes rounder. The start-point rounding vector and the end-point rounding vector are used when a lattice structure is reconstructed by applying an inverse rounding operation to a free-form surface model. These vectors relate to information about roundness of a cubic Bezier curve, and define tangent vectors at the start point and the end point of the curve. If a given shape model can be converted into a free-form surface model comprised of edges that are all represented by either a cubic Bezier curve or a straight line, such a shape can be described in the XVL format. In such a case, the start-point vector and the end-point vector are added to the edge rounding information.

In the following, a process of the second embodiment will be described with reference to the lattice polygon model shown in FIG. 1. This description is provided to supplement the description provided in connection with the first embodiment.

At STEP1 (II) in the first embodiment, a center point (i.e., a coordinate average) of vertices that constitute a generated quadrilateral is obtained so as to create a new vertex inside the quadrilateral (FIG. 4).

Figure 17:
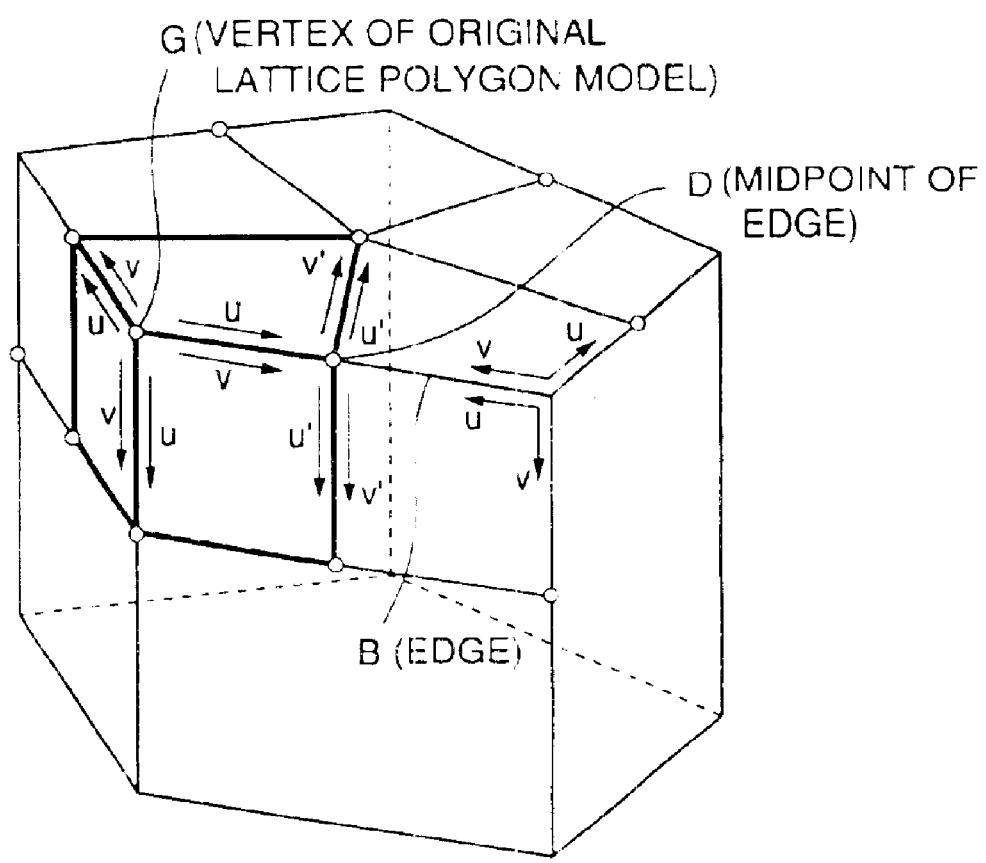
FIG. 17 is an illustrative drawing for explaining a rounding coefficient.

The rounding coefficient changes the way the new vertex is obtained. When the rounding coefficient is specified, a new vertex inside a quadrilateral is obtained, as shown in FIG. 17, after changing u and v from their standard values 0.5 on the u-v parameter space of the quadrilateral.

When the rounding coefficient of the vertex G is set to 0.2 (smaller than its standard value), parameters u and v of each relevant quadrilateral are each set to 0.2. As a result, a vertex of a free-form surface model generated at the step STEP1 comes closer to the vertex G, so that the generated free-form surface model has a shape closer to the original lattice polygon model. If the rounding coefficient of a vertex is set to a value larger than the standard value, a rounded free-form surface model is generated, having a corresponding vertex farther away from the vertex of the original lattice polygon model compared to when the standard value is used.

If the rounding coefficient of the edge B (i.e., the rounding coefficient of the midpoint D of the edge B) is set to a value smaller than its standard value, parameters u' and v' of quadrilaterals relating to the edge B are set to a smaller value. As a result, an edge of a free-form surface model generated at the step STEP1 comes closer to the edge B of the lattice polygon model, so that the generated free-form surface model has a shape closer to the original lattice polygon model. If the rounding coefficient of an edge is set to a value larger than the standard value a rounded free-form surface model is generated, having a corresponding edge farther away from the edge of the original lattice polygon model compared to when the standard value is used.

EXAMPLE

According to the second embodiment of the present invention, a surface model generated from an original lattice structure that is a lattice polygon model of FIG. 9A plus some rounding information may be a shape that adds some roundness or sharpness to the vertices and/or edges shown in FIG. 9B. The surface model corresponding to the shape of FIG. 9B may undergo the inverse rounding operation, thereby generating the shape of FIG. 9A. As the shape of FIG. 9A is represented in the XVL format, data size of the output data can be reduced by a significant amount.

Figure 18A:
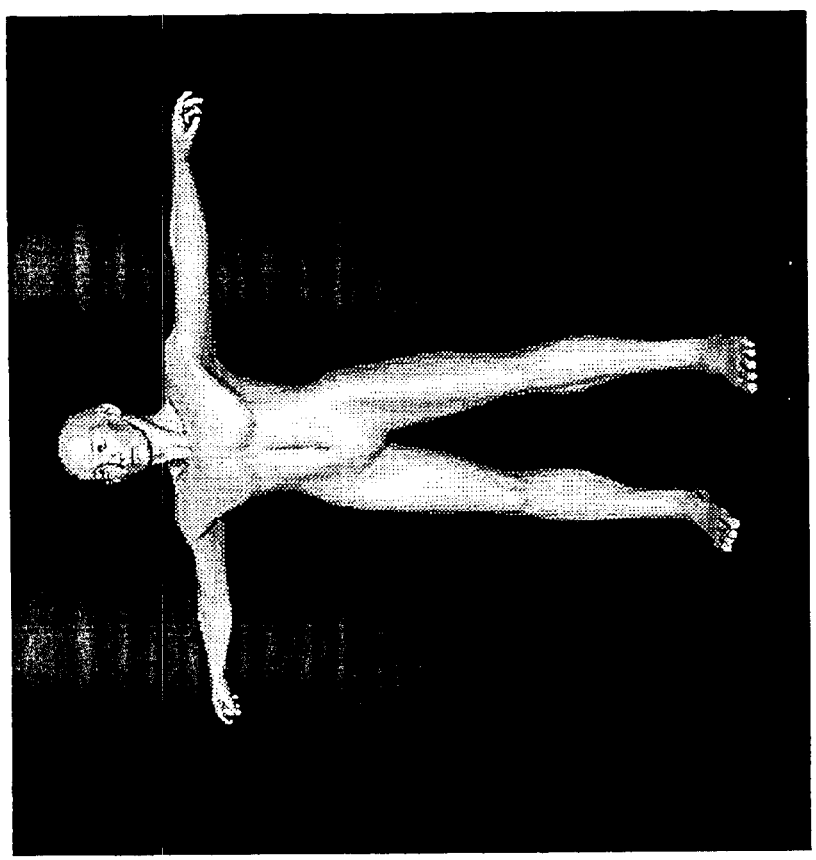
FIGS. 18A and 18B are illustrative drawings showing a human model represented in an XVL format and an example of shading display thereof.
Figure 18B:
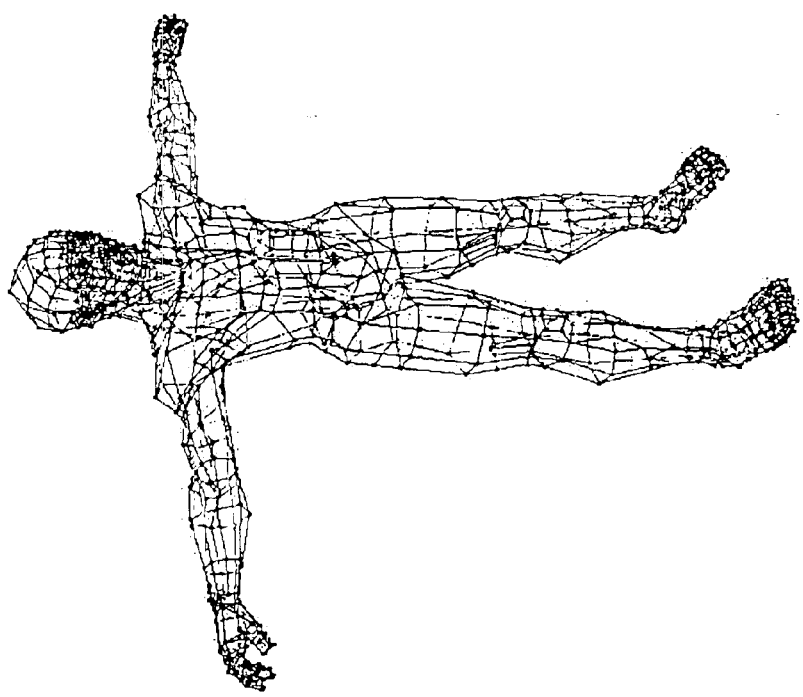
Figure 19:
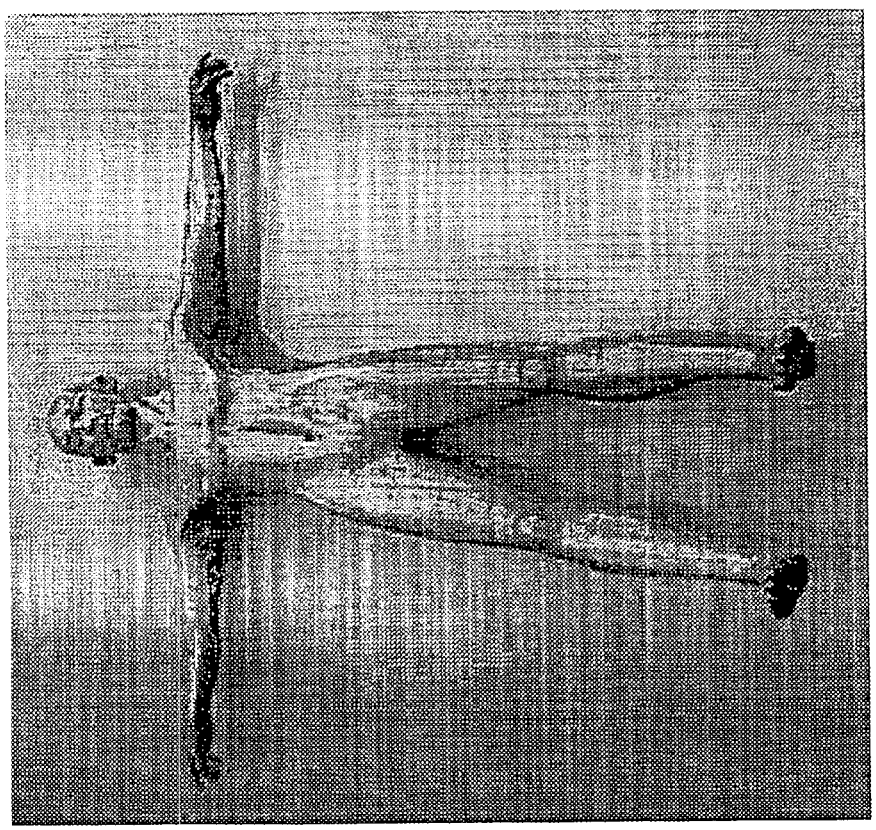
FIG. 19 is a drawing showing an example of real model generation.

FIGS. 18A and 18B are illustrative drawings showing a human model represented in the XVL format and an example of shading display thereof. The XVL data shown in FIG. 18A has a relatively small data size (44 Kbytes in this example), it can be easily transmitted via a network. Based on this lattice polygon model, a surface model is created as shown in FIG. 18B. When this function is implemented in a viewer, such a configuration makes it possible to read XVL over a network and attend to 3-dimensional display that looks real in the network environment. Further, when a surface model generated from an XVL format is supplied in a data format that can be used in a RP (Rapid Prototyping) device, a real model as shown in FIG. 19 can be created. Further, if data for use in a CAM system is generated from the surface model, the real model as described above can be further processed for manipulation and changing of shape.

As is apparent from the description provided above, the present invention generates a free-form surface model that has one-to-one correspondences with the original polygon model in terms of vertices, edges, and surfaces, thereby providing a perfectly reversible rounding operation. Since the polygon model and the free-form surface model have the same topology, the free-form surface model can inherit attributes given to the original polygon model. Namely, attributes such as colors and textures provided for the lattice polygon model can be passed on to the free-form surface model. This is one of the advantages that is difficult to attain in the related art.

According to the XVL format of the present invention data has a lattice structure that includes a surface structure. The XVL format thus has an advantage in that a relatively small data size suffices to represent shape while high quality of data representation is maintained.

According to the XVL format of the present invention, free-form surface shape is represented by interpolating free-form surfaces that are defined by a lattice structure, which is a combination of lattice information and rounding information. This approach achieves a certain level of accuracy while reducing a data size. Because of a small data size, use of data in a network environment is viable. Further, data representation of free-form surfaces provides for application of XVL data in CAD/CAM systems.

Further, the present invention is not limited to these embodiments, but various variations and modifications may be made without departing from the scope of the present invention.

The present application is in part based on Japanese priority application no. 12-001136 filed on Jan. 6, 2000 with the Japanese Patent Office, the entire contents of which are hereby incorporated by reference.

What is claimed is:

1. A method of generating a free-form surface model by a rounding operation, comprising:

applying a linear transformation as said rounding operation to a lattice polygon model to generate vertices of a free-form surface model corresponding to respective vertices of the lattice polygon model, said linear transformation having an inverse transformation that serves as an inverse rounding operation to reconstruct the lattice polygon model from the free-form surface model; and generating control points of cubic Bezier curves that connect the vertices of the free-form surface model, and that correspond to respective edges of the lattice polygon model.

2. The method as claimed in claim 1, further comprising: interpolating Gregory patches into a mesh comprised of the cubic Bezier curves.

3. The method as claimed in claim 1, wherein said rounding operation allows an inverse rounding operation to reconstruct the lattice polygon model from the free-form surface model.

4. A method of generating a free-form surface model by a rounding operation, comprising:

applying a linear transformation to a lattice polygon model to generate vertices of a free-form surface model corresponding to respective vertices of the lattice polygon model;

generating control points of cubic Bezier curves that connect the vertices of the free-form surface model, and that correspond to respective edges of the lattice polygon model; and adding rounding information to the lattice polygon model, the rounding information controlling how round the free-form surface model is when the free-form surface model is generated from the lattice polygon model and the rounding information, wherein said step of applying the linear transformation includes generating the vertices of the free-form surface model by utilizing the rounding information.

5. The method as claimed in claim 4, wherein said rounding information includes rounding information attached to the vertices and the edges of the lattice polygon model.

6. A method of generating a free-form surface model by a rounding operation comprising:

applying a linear transformation to a lattice polygon model to generate vertices of a free-form surface model corresponding, to respective vertices of the lattice polygon model;

generating control points of cubic Bezier curves that connect the vertices of the free-form surface model, and that correspond to respective edges of the lattice polygon model; and reconstructing the lattice polygon model from the free-form surface model by utilizing an inverse transformation of the linear transformation.

7. A computer-readable memory medium having a program embodied therein for causing a computer to generate a free-form surface model by a rounding operation, said program comprising program code units configured to perform:

applying a linear transformation as said rounding operation to a lattice polygon model to generate vertices of a free-form surface model corresponding to respective vertices of the lattice polygon model, said linear transformation having an inverse transformation that serves as an inverse rounding operation to reconstruct the lattice polygon model from the free-form surface model; and generating control points of cubic Bezier curves that connect the vertices of the free-form surface model, and that correspond to respective edges of the lattice polygon model.

8. The computer-readable memory medium as claimed in claim 7, further comprising:

interpolating Gregory patches into a mesh comprised of the cubic Bezier curves.

9. The method as claimed in claim 7, wherein said rounding operation allows an inverse rounding operation to reconstruct the lattice polygon model from the free form surface model.

10. A computer-readable memory medium having a program embodied therein for causing a computer to generate a free-form surface model by a rounding operation, said program comprising program code units configured to perform:

applying a linear transformation operation to a lattice polygon model to generate vertices of a free-form surface model corresponding to respective vertices of the lattice polygon model;

generating control points of cubic Bezier curves that connect the vertices of the free-form surface model, and that correspond to respective edges of the lattice polygon model; and adding rounding information to the lattice polygon model, the rounding information controlling how round the free-form surface model is when the free-form surface model is generated from the lattice polygon model and the rounding information, wherein said step of applying the linear transformation includes generating the vertices of the free-form surface model by utilizing the rounding information.

11. The computer-readable memory medium as claimed in claim 10, wherein said rounding information includes rounding information attached to the vertices and the edges of the lattice polygon model.

12. A computer-readable memory medium having a program embodied therein for causing a computer to generate a free-form surface model by a rounding operation, said program comprising program code units configured to perform:

applying a linear transformation to a lattice polygon model to generate vertices of a free-form surface model corresponding to respective vertices of the lattice polygon model;

generating control points of cubic Bezier curves that connect the vertices of the free-form surface model, and that correspond to respective edges of the lattice polygon model; and reconstructing the lattice polygon model from the free-form surface model by utilizing an inverse transformation of the linear transformation.

13. A method of transmitting 3D data via a network, comprising:

adding rounding information to a lattice polygon model, the rounding information controlling how round a free-form surface model is when the free-form surface model is generated from the lattice polygon model and the rounding information by applying linear transformation to the lattice polygon model to generate vertices of the free-form surface model corresponding to respective vertices of the lattice polygon model, and generating control points of cubic Bezier curves that connect the vertices of the free-form surface model, and that correspond to respective edges of the lattice polygon model; and transmitting the lattice polygon model and the rounding information over the network.

14. A method of generating a free-form surface model, comprising:

receiving a lattice polygon model and rounding information via a network;

applying linear transformation to the lattice polygon model to generate vertices of a free-form surface model corresponding to respective vertices of the lattice polygon model; and generating control points of cubic Bezier curves that serve as edges to connect the vertices of the free-form surface model, and that correspond to respective edges of the lattice polygon model, wherein the rounding information controls how close the vertices and edges of the free-form surface model are to the respective vertices and edges of the lattice polygon model.

15. A server device for transmitting 3D data via a network, configured to add rounding information to a lattice polygon model, the rounding information controlling how round a free-form surface model is when the free-form surface model is generated from the lattice polygon model and the rounding information by applying linear transformation to the lattice polygon model to generate vertices of the free-form surface model corresponding to respective vertices of the lattice polygon model, and generating control points of cubic Bezier curves that connect the vertices of the free-form surface model, and that correspond to respective edges of the lattice polygon model; and to transmit the lattice polygon model and the rounding information over the network.

16. A client device connected to a network, configured to receive a lattice polygon model and rounding information via the network;

to apply linear transformation to the lattice polygon model to generate vertices of a free-form surface model corresponding to respective vertices of the lattice polygon model; and to generate control points of cubic Bezier curves that serve as edges to connect the vertices of the free-form surface model, and that correspond to respective edges of the lattice polygon model, wherein the rounding information controls how close the vertices and edges of the free-form surface model are to the respective vertices and edges of the lattice polygon model.

* * * * *